United States Patent [19]
Hansen

[11] Patent Number: 6,126,419
[45] Date of Patent: Oct. 3, 2000

[54] CAUSTIC PUMPING APPARATUS

[76] Inventor: Jerry W. Hansen, 1370 Soloman Rd., Santa Maria, Calif. 93455

[21] Appl. No.: 09/100,383

[22] Filed: Jun. 19, 1998

[51] Int. Cl.[7] ........................................................ F04B 39/10
[52] U.S. Cl. ............................................. 417/536; 417/568
[58] Field of Search ................................... 417/536, 535, 417/567, 568

[56] References Cited

U.S. PATENT DOCUMENTS

| | | |
|---|---|---|
| 1,400,477 | 12/1921 | Curtis . |
| 1,975,583 | 10/1934 | Latham . |
| 2,559,980 | 7/1951 | McAllister . |
| 2,777,427 | 1/1957 | Nichols . |
| 4,679,994 | 7/1987 | Brown . |
| 4,936,753 | 6/1990 | Kozumplik, Jr. et al. ............... 417/238 |
| 5,044,891 | 9/1991 | Ozawa ..................................... 417/214 |
| 5,388,369 | 2/1995 | Moore ........................................ 47/1.5 |
| 5,507,630 | 4/1996 | Hegebarth ............................... 417/454 |
| 5,676,531 | 10/1997 | Muscarella et al. .................. 417/413.1 |

OTHER PUBLICATIONS

Hypro Medium Pressure Diaphragm Manual, Nov. 1995, pp. 1 and 13.

*Primary Examiner*—Henry Bennett
*Assistant Examiner*—Marc Norman
*Attorney, Agent, or Firm*—Leo F. Costello

[57] ABSTRACT

Valve heads for modifying a pump to handling corrosive liquids are made of the thermoplastic UHMW-PE machined into a generally rectangular block having longitudinally extending front, back, and opposite side faces and transversely extending top and bottom faces, each of the faces being smooth and flat for convenient handling and storage. Each modified valve head is provided with an elongated cylindrical valve chamber adapted to slidably receive the standard valve body and a frusto-conical manifold recess intersecting and communicating with the valve chamber and having an outer opening that opens out of its front face. Inlet and outlet ports extend from opposite side faces through the valve head and communicate respectively with the lower and upper ends of the valve chamber. In addition, bolts extend through each valve head spaced outwardly from the manifold recess and the valve chamber and inwardly from the inlet and outlet ports for releasably attaching the valve heads in fluid-tight relation to the housing in place of the standard heads, and bolts releasably hold-down the valve bodies in their valve chambers. Caustic and non-caustic liquids are delivered to, and discharged from, the pump through plastic pipes, such as PVC, connected to the inlet and outlet ports. As a result, the standard ducting through the aluminum parts is by-passed and the pump is able to handle corrosive materials without leaking and breaking down.

17 Claims, 6 Drawing Sheets

CAUSTIC PUMPING APPARATUS

BACKGROUND

The current trend in growing fruits and vegetables on a relatively large scale is to deliver liquid fertilizer to the crops along with irrigation water usually by drip irrigation. A very popular pump for delivering liquid fertilizer as well as other materials is a diaphragm puimp supplied by the Hypro Corporation of 375 Fifth Avenue NW, Brighton, Minn. 55112-3288.

The pump housing or body and the valve heads of the Hypro pump are made of cast aluminum. The supply of liquid to be pumped is fed through an inlet line into the pump housing through an inlet fitting, then sucked through inlet ducts in the pump housing to the valve hleads that force it back into the pump housing through outlet ducts that connect to an outlet fitting from which it is discharged into an outlet line.

Although the Hypro pump operates very well with non-corrosive materials, it has been found to deteriorate very rapidly, within about a week of use, when acidic fertilizers are pumped. Because the acidic materials are ducted through the aluminum housing and valve heads, the acid quickly corrodes these parts, and the pump starts to leak and quickly becomes inoperative Ranchers who have purchased these pumps are understandably desirous of correcting the problem of handling acidic fertilizers without having to invest in a new or separate pump for this purpose. Moreover, they would like to be able to modify these pumps themselves without incurring the costs of having someone else do it.

SUMMARY

Valve heads for modifying a pump to handling corrosive liquids are disclosed. The modified valve heads are made of thermoplastic having high-impact strength, resistance to abrasion and stress-cracking, high tensile strength, a low coefficient of friction and tolerant to variations in temperature and weathering conditions, in addition to resistance to corrosive chemicals. Each heads is preferably machined from a larger block of such plastic into a generally rectangular block having longitudinally extending front, back, and opposite side faces, and transversely extending top and bottom faces, each of the faces being smooth and flat for convenient handling and storage. Each modified valve head is provided with an elongated cylindrical valve chamber adapted to slidably receive the standard valve body and a frusto-conical manifold recess intersecting and communicating with the valve chamber and having an outer opening that opens out of its front face. Inlet and outlet ports extend from opposite side faces through the valve head and communicate respectively with the lower and upper ends of the valve chamber. In addition, bolts extend through each valve head spaced outwardly from the manifold recess and the valve chamber and inwardly from the inlet and outlet ports for releasably attaching the valve heads in fluid-tight relation to the housing in place of the standard heads, and bolts releasably hold-down the valve bodies in their valve chambers. Caustic and nonstustic liquids are delivered to, and discharged from, the pump through plastic pipes, such as PVC, connected to the inlet and outlet ports. As a result the standard ducting through the aluminum parts is by-passed and the pump is able to handle corrosive materials without leaking and breaking down.

An object of the present invention is to provide a pump that will routinely handle acidic materials without deterioration and breakdown.

Another object is to modify a popular pump for pumping liquid fertilizers so that it can handle acidic fertilizers without leaking.

A still further object is to modify a pump that was originally constructed to cail the liquid being pumped within its pump housing by causing the liquid to be carried outside of the pump housing and out of contact with those parts of the pump that are subject to corrosion when exposed to acidic materials.

Yet another object is to modify the valve heads on a pump so that the heads can carry acidic materials without deterioration.

An important object is to provide acid-resistant valve heads that can readily be attached to a pump housing and connected to by-pass lines that are acid-resistant by a user that already ovens a pump, thereby obviating the need to purchase a new pump or incur the cost of hiring a third party to modify the pump.

A still further object is to facilitate the handling, marketing and use of acid-resistant valve heads that are intended to replace the valve heads of a pump so as to enable the pump to handle acidic materials.

Yet an additional object is to make valve heads of a plastic material that is capable of being machined or molded that is also abrasion resistant, has a high tensile strength displays resistance to stress cracking, has a low coefficient of friction, and particularly is capable of handling acidic materials at adequate flow rates and pressures.

A feature of this invention is the use of the thermoplastic UHMW-PE as the material for valve heads of a pump so that the pump can handle acidic materials.

These and other objects will become apparent upon reference to the following description and dependent claims and to the accompanying drawings.

DETAILED DESCRIPTION

Figure 1:
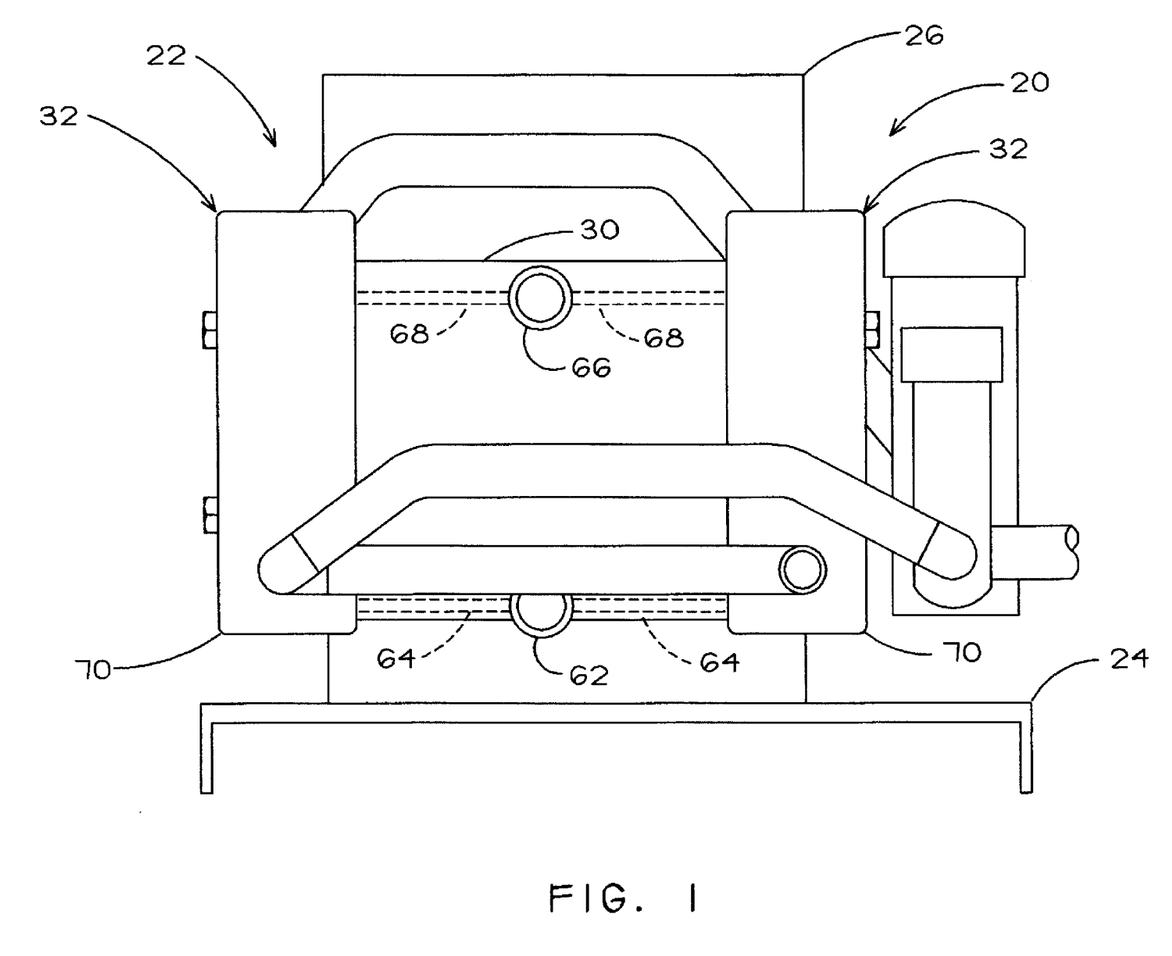
FIG. 1 is a side elevation of a pumping apparatus that has been modified to handle caustic liquids in accordance with the present invention.
Figure 2:
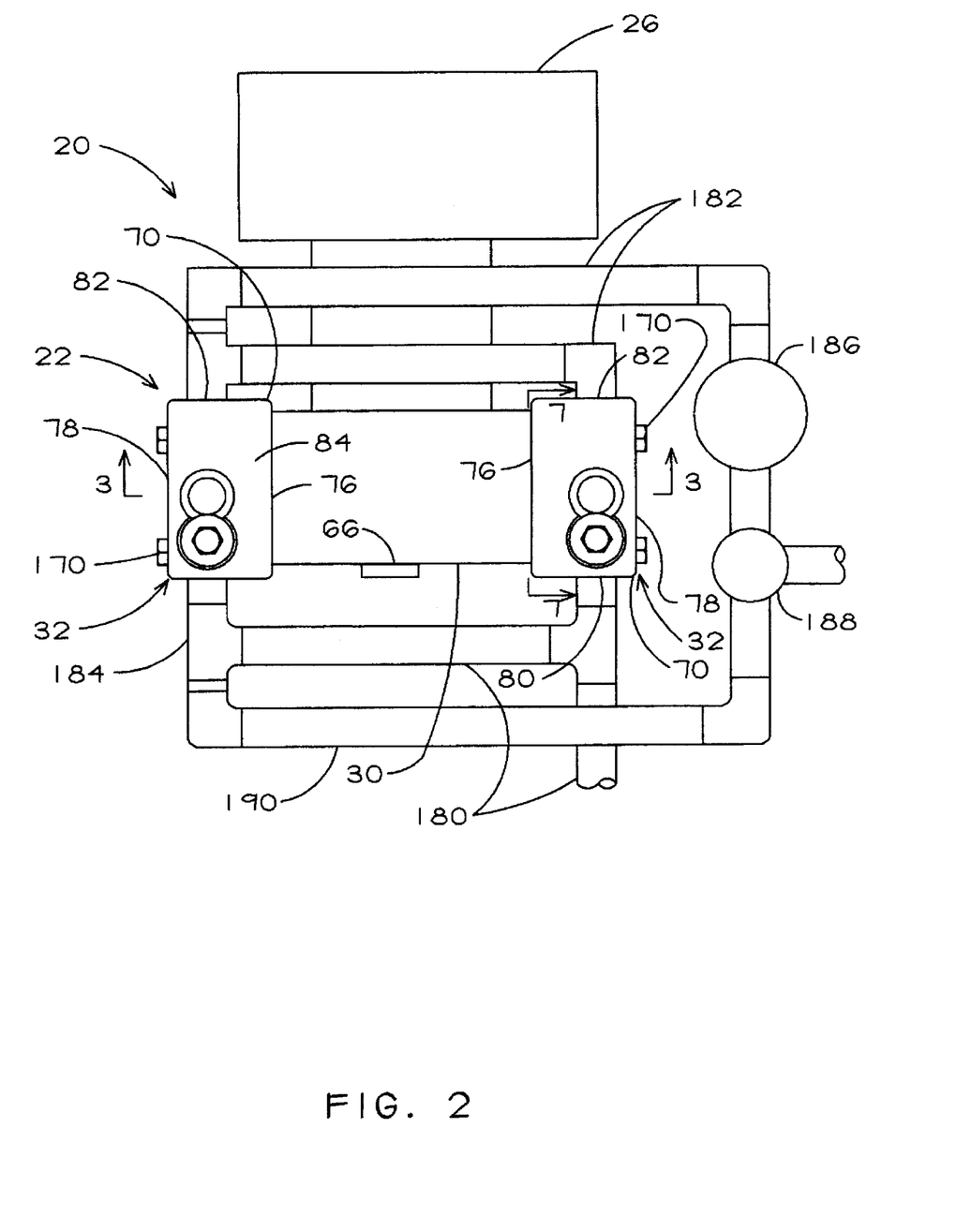
FIG. 2 is a top plan view of the pumping apparatus shown in FIG. 1.

A pumping apparatus that has been modified to handle corrosive liquids in accordance with the present invention is generally indicated by the number 20 in FIGS. 1 and 2. This pumping apparatus includes a diaphragm pump 22 of the type manufactured by the Hypro Corporation of 375 Fifth Avenue, New Brighton, Minn. 55112-3288. As shown in FIG. 1, the pump is supported on a platform 24 and is driven by a motor 26. The unmodified Hypro pump is recommended for spraying herbicides, pesticides, liquid fertilizer, and many other hard-to-handle fluids. The unmodified Hypro pump conducts the liquids being pumped through the pump body and the valve heads, both of which are made of cast aluminum. As a result, when such a pump is used to pump corrosive liquids, such as acid fertilizers containing infuric and neufiric acids, the pump leaks within about one week of use. What is illustrated in the drawings and described below, then, is a modification of this pump to allow it to handle such corrosive liquids without leaking or otherwise breaking down.

Figure 3:
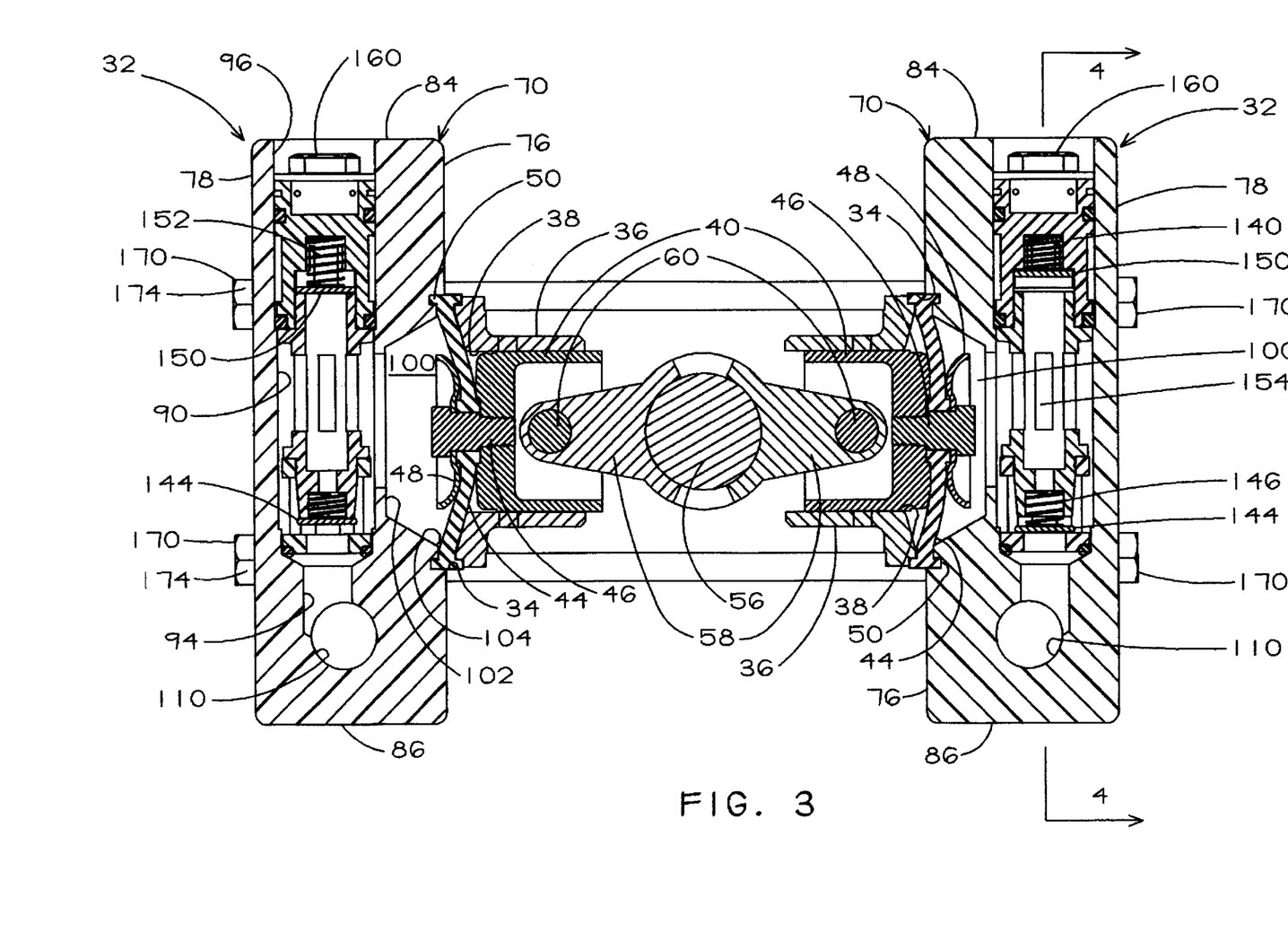
FIG. 3 is a somewhat enlarged, longitudinal vertical section taken on line 3—3 in FIG. 2.

The modified pump 22 (FIGS. 1 through 3) includes a pump housing or body 30 between a pair of pump valves 32 that incorporate the principles of the present invention. The housing (FIG. 3) includes a pair of axially aligned openings 34, and piston sleeves 36 are mounted in the housing having open ends 38 coaxial with the openings 34. Pistons 40 are individually mounted in the sleeves for reciprocating movement therein inwardly and outwardly of the open ends 38 between suction and compression strokes respectively. In FIG. 3, the piston on the right is shown in its compression stroke, whereas the piston on the left is shown in its suction stroke.

Circular, flexible diaphragms 44 (FIG. 3) made of plastic are individually mounted on the pistons 40 by supporting bolts and washers 46 and 48. The manufacturer makes the diaphragms of Desmopan, Buna-N, or Teflon which, as it turns out, are acid-resistant. Each diaphragm is in circumscribing fluid-tight relation to its mounting bolt and has an annular rim 50 that projects endwardly of its adjacent opening 34. The manufacturer makes the washers out of 3316 stainless steel which resists acid but makes the bolts out of 400 stainless steel that does not resist acids.

The pumping apparatus 20 (FIG. 3) also includes an eccentric crankshaft 56 driven by the motor 26 and attached to a pair of connecting arms 58. The connecting arms are fastened to the pistons 40 by pins 60, so that upon rotation of the crankshaft, the pistons and their associated diaphragms 44 are reciprocated between compression and suction strokes, as above indicated and as shown in FIG. 3.

The pump housing 30 (FIG. 3), the piston sleeves 36, the pistons 40, the diaphragms 44, the supporting bolts and washers 46 and 48, the crankshaft 56, the connecting arms 58, and the pins 60 are all parts of the standard Hypro pump referred to above and thus are well known. All of these parts, with the exception of the diaphragms and the mounting washers 48, are made of materials (cast aluminum and 400 stainless steel) that do not resist acids. Thus, with the exception of the diaphragms and washers, all of these parts of the standard Hypro pump are subject to corrosion if contacted by acids, causing the pump to leak.

In the standard Hypro pump, liquids to be pumped are delivered to the pump through an inlet fitting 62 and thus in opposite directions through inlet ducts 64 in the pump housing, as indicated in dashed lines in FIG. 1 but unused in the present invention, to the standard Hypro valve heads. From these inlet ducts, the liquid is drawn into and forced out of the Hypro valve heads. From the valve heads the liquid passes back into the pump housing through the outlet ducts 68 and is discharged through the outlet fitting 66; again, the outlet ducts 68 and outlet fitting are not used with the present invention. If this standard Hypro pump is used to pump corrosive liquids, contact of such liquids with the housing 30, the supporting bolts 46, the valve heads, as well as other parts of the housing, will corrode these parts very quickly and disables the pump.

The standard Hypro pump, as discussed above, is modified in accordance with the present invention in three ways. First, the standard Hypro valve heads, not shown, are replaced by the valve heads 70 of the present invention, as shown in FIG. 3. Secondly, and as indicated above, the inlet and outlet fittings 62 and 66 and the inlet and outlet ducts 64 and 68 are not used to deliver liquid to the valve heads 70, but such delivery is accomplished outside of the pump housing, that is by-passes the housing, as will be described. Third, the standard bolts 46 made of 400 stainless steel are replaced with bolts 46 made of 316 stainless steel that resists acids.

The valve heads 70 (FIG. 3) have the identical polygonal exterior shape and size, a convenience for handling as will be described, although interiorly, they are not identical bout are mirror images of each other. Thus, the heads are provided in matched pairs. Although the present invention is not limited to particular dimensions, each head is compact and preferably is about 3½" wide (side to side)×2" deep (front to back)×6" long (top to bottom) and is light, weighing about sixteen ounces. Each valve head 70 is thus a generally rectangular block machined from a piece of acid-resistant plastic. The material is a thermoplastic having high-impact strength, resistance to abrasion and stress-cracking, high tensile strength, a low coefficient of friction, and tolerance to variations in temperature and other weathering conditions, in addition to its resistance to corrosive chemicals. Experimentation has shown that an excellent thermoplastic for the described purpose is the product identified as UHMW-PE, a thermoplastic made by Solidur Pacific Co. of 18179 S.W. Boones Ferry Road, Portland, Oreg. 97223.

Each valve head 70 (FIGS. 3 through 7) has longitudinally extending front, back, and opposite side faces respectively 76, 78, 80, and 82, and transversely extending top and bottom faces 84 and 86, respectively. Each of these faces is machined or molded smooth and flat with adjacent faces being perpendicular to each other. Each valve is also provided with an elongated cylindrical valve chamber 90 that extends longitudinally of its respective valve head in laterally offset relation to the longitudinal axis 92 of its respective valve head, for a reason to be explained. Each valve chamber has a closed lower end 94 spaced upwardly of the bottom face 86 (about one-half inch with the other dimensions stated above) and an open upper end 96 that opens out of the top face 84 of its valve head.

Figure 4:
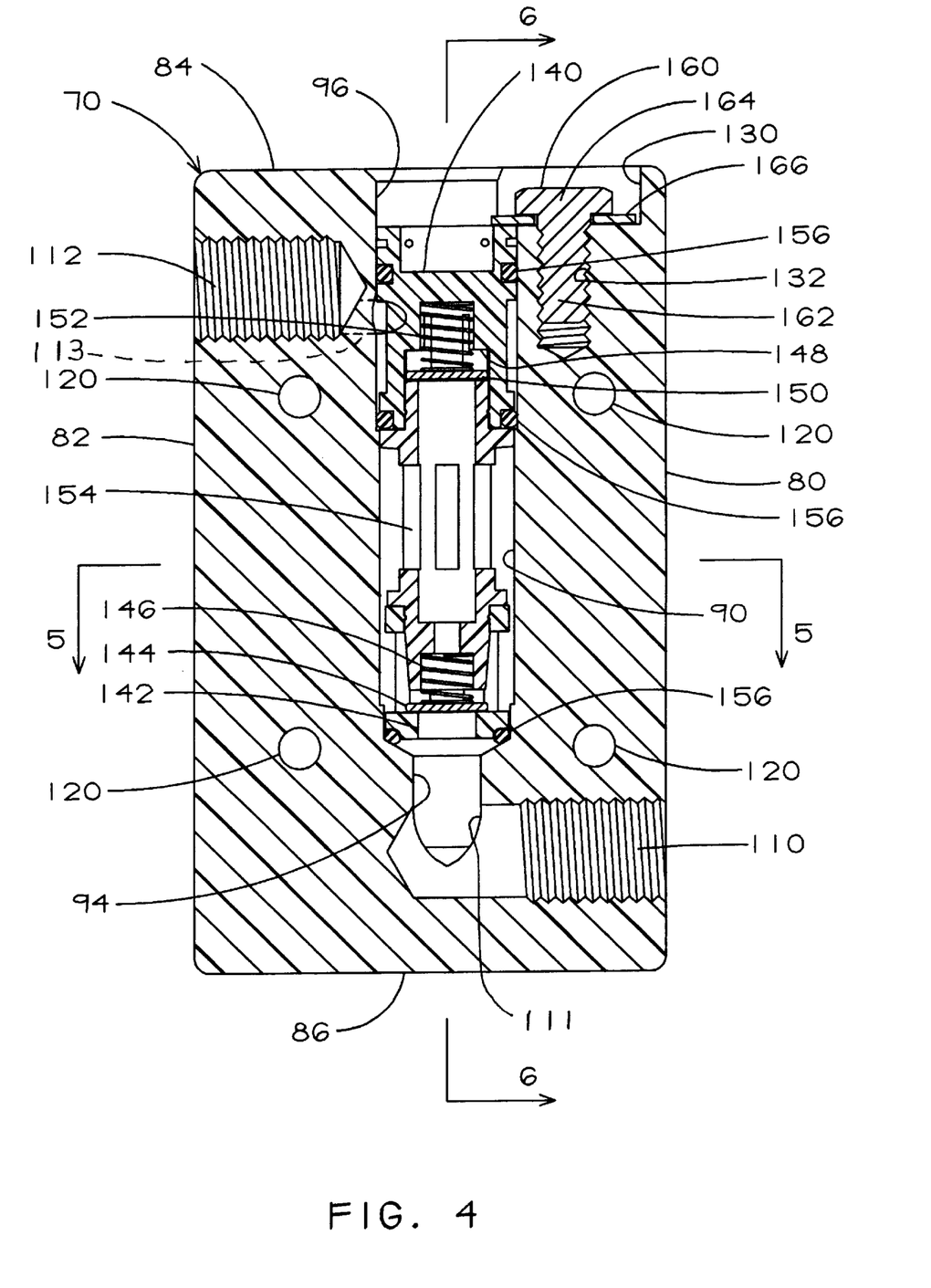
FIG. 4 is a somewhat enlarged transverse vertical section taken along a plane indicated by line 4—4 in FIG. 3.
Figure 5:
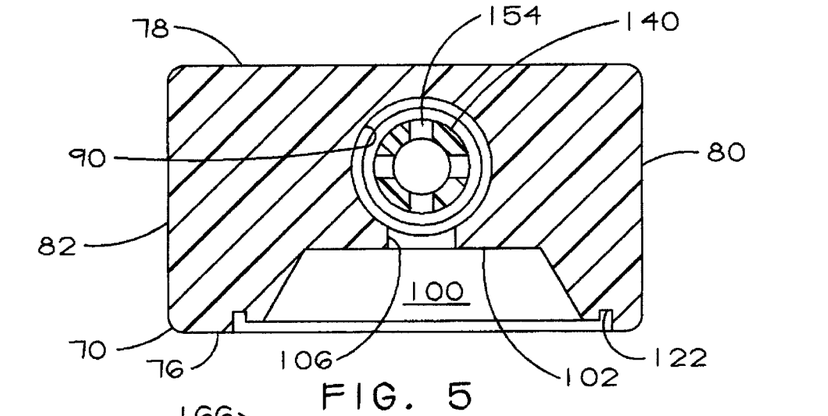
FIG. 5 is a horizontal section taken along a plane indicated by line 5—5 in FIG. 4.
Figure 6:
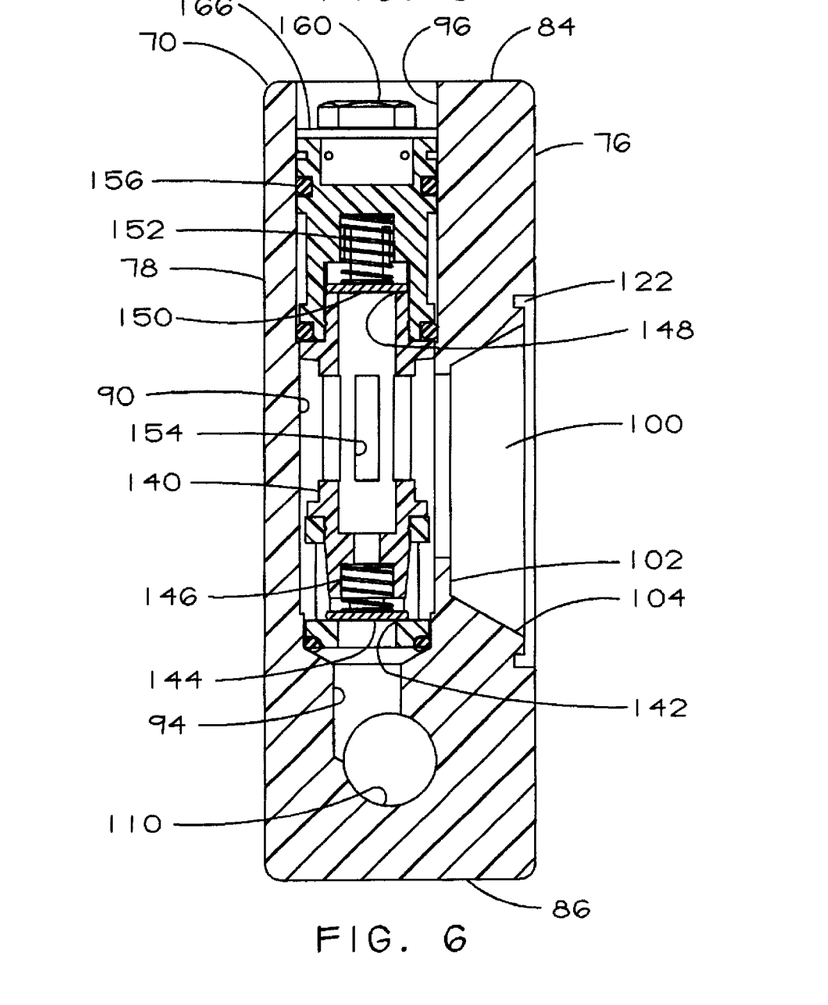
FIG. 6 is a longitudinal vertical section taken along a plane indicated by line 6—6 in FIG. 4.

Each valve head 70 (FIGS. 3 and 5 through 7) is also provided with a frusto-conical manifold recess 100 that extends transversely of its valve head and axially intersects its valve chamber 90. Each manifold recess has an inner wall 102 of minimum diameter and an outer opening 104 of maximum diameter. The inner wall 102 of each recess has a longitudinally extending slot 106 that provides fluid communication between its respective valve chamber 90 and the manifold recess 100. In addition, each valve head has a lower threaded inlet port 110 in one of the side faces 80 and an upper threaded outlet port 112 and the other side face 82. The axis of the inlet port is below the lower end 94 of its respective valve chamber 90 but communicates with such lower end 94 through longitudinal passage 111 as shown in FIG. 4. The outlet port extends along an axis that intersects the valve chamber and communicates with the uppper end 96 of its respective valve chamber through transverse passage 113.

In order to provide for handling pressures of eighty pounds per square inch and higher, the inlet and outlet ports 110 and 112 (FIG. 4) must have at least one inch of threads from their respective side wall 80 and 82 into the valve head 70. As a result, in order to allow for a full inch of threads in the outlet port 112, the valve chamber 90 is offset from the longitudinal axis 92, as stated. Such offsetting does not intrude on the inlet port, however, because the lower end 94 of the valve chamber terminates above the inlet port 110 as described.

Figure 7:
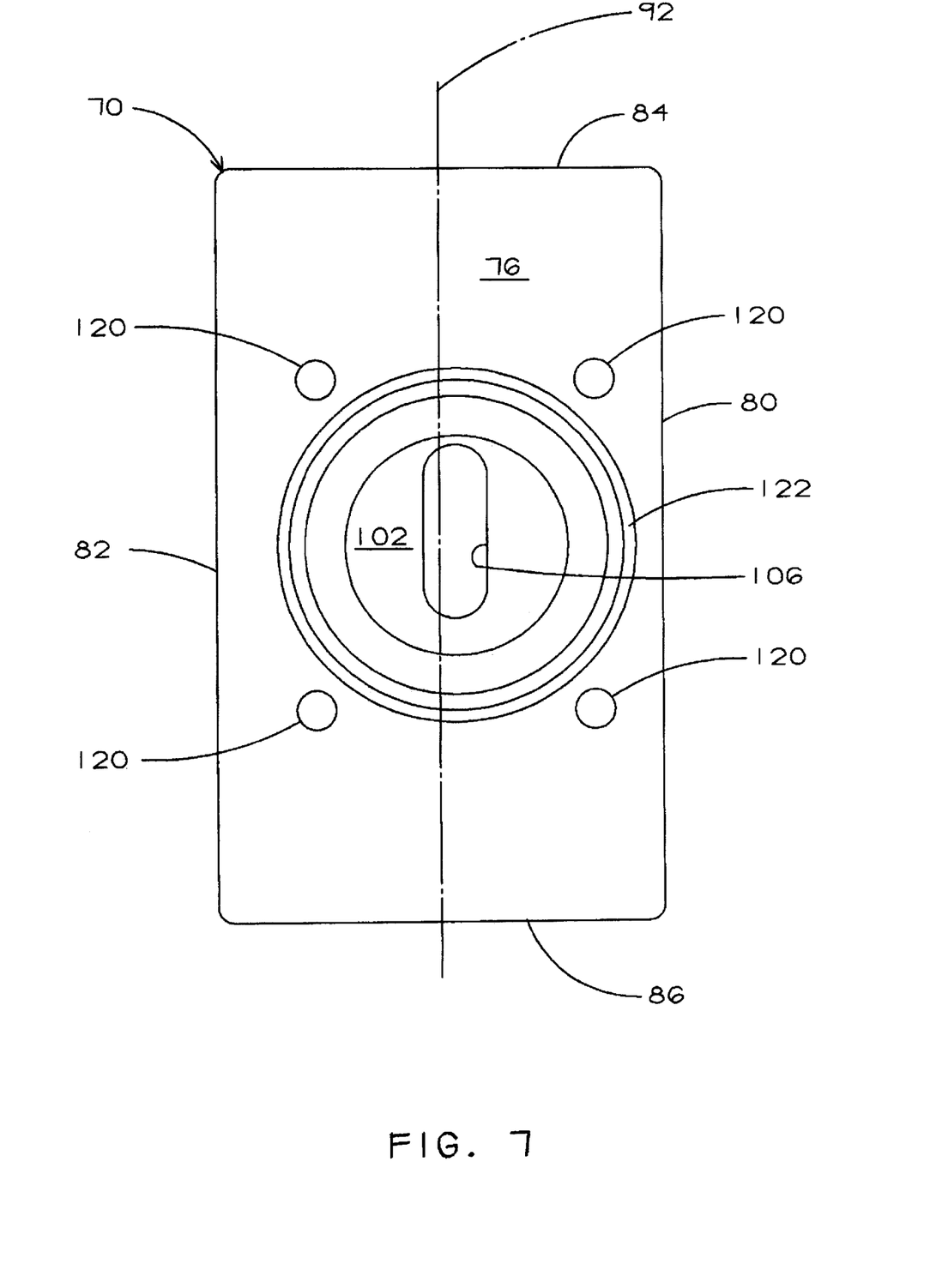
FIG. 7 is a somewhat enlarged front elevation of one of the valve heads of the subject invention.

As best shown in FIGS. 3, 4, and 7, each valve head 70 has four mounting bores 120 drilled therethrough from the back face 78 to the front face 76 and in outwardly spaced relation of its respective valve chamber 90 and inwardly spaced relation to its respective inlet and outlet port 110 and 112. The front face 76 of each valve head has an annular sealing groove 122 in concentric circumscribing relation to the outer opening 104 of the manifold recess 100 of its corresponding valve head, it being noted that this groove is disposed radially inwardly of the mounting bores (FIG. 7). Still further, each valve head has a countersunk hole 130 (FIG. 4) extending downwardly from the top face 84 of the valve head, and an upper threaded retainer hole 132 extending inwardly of the valve head from the countersunk hole. The retainer hole is laterally offset from the valve chamber 90, but the countersunk hole overlaps and opens into the valve chamber.

A valve body 140 (FIGS. 3 through 6) containing a check valve is fitted in each valve chamber 90. The valve body is the same as is used in the standard HR,pro pump previously described. This valve body provides an inlet valve seat 142, a lower inlet poppet 144, an inlet compression spring 146, an upper outlet valve seat 148, an outlet poppet 150, an outlet compression spring 152, valve openings 154, and suitable O-rings 156 that seal between the valve body and the valve head 70. Hypro manufactures the valve body of a plastic except for the springs which are of an acid-resistant stainless steel so that the valve body is acid-resistant.

Hold-down bolts 160 (FIGS. 3, 4, and 6) have shanks 162 threaded into the retainer holes 132 and bolt heads 164 located in the countersunk holes 130. Washers 166 are placed under the heads of the bolts and overlap the upper ends of the valve bodies 140 in order to retain them in their positions in the valve chambers 90.

The valve head 70 are attached to the pump housing 30 with mounting bolts 170 having shanks that extend through the mounting bores 120 and thread into the pump housing with bolt heads 174 engaging the back surfaces 78 of the respective valve heads. As attached to the housing, the sealing grooves 122 receive the rims 50 of the diaphragms 44 so as to provide fluid-tight seals between the valve heads and the diaphragms. Plastic inlet and outlet conduit 180 and 182 (FIGS. 1 and 2), preferably of PVC plastic, deliver acid-based liquids to the valve heads 70 and carry liquids out of the valve heads, respectively. These conduits are directly connected to the valve heads by inlet and outlet fittings 184 threaded into the inlet and outlet ports 110 and 112, respectively. Although not part of the subject invention, it is noted that the outlet conduit feeds the liquid through a damper 186 and a pressure regulator 188 from which a bypass line 190 connects back to the inlet fitting 184 to protect against excess pressures.

In operation, acidic fertilizers, or other acidic liquids, are supplied to the pumping apparatus 20 through the inlet conduit 180 which delivers this material to the inlet ports 110 of the valve heads 70. The pump 22 is driven by the motor 26 which causes the eccentric crankshaft 56 to rotate and reciprocate the pistons 40. This causes the diaphragms 44 to move between their compression and suction strokes respectively shown at the right and left of FIG. 3.

On the suction stroke (FIG. 3 left) of the diaphragm 44, the acidic liquid is drain into the left manifold 100 of the left valve head 70 from the inlet conduit 180 and left inlet port 110. On the compression stroke (FIG. 3 right), liquid is forced out of the right manifold through the right valve head and valve body and discharged into the outlet conduit 182 from the outlet port 112. During its travel through the pumping apparatus 20, the corrosive liquid does not come in contact with any of the parts of the pump that cannot withstand the acids.

That is, liquid entering or leaving the pumping apparatus 20 (FIGS. 1, 2, and 3) travel through the inlet and outlet conduits 180, 182 which are made of an acid resistant plastic such as PVC. Liquid that enters the inlet port 110 or that leaves through the outlet port 112 contacts the valve heads 70 which are made of the acid-resisting plastic UHMW-PE and the valve bodies which are also made of an acid-resisting plastic. Liquid in the manifolds 100 contact with the diaphragms 44 and their mounting washers 44 and bolts 46 which now are all acid-resistant. The inlet and outlet springs 146 and 152, the inlet and outlet poppets 144 and 150, the supporting bolts 46, and the supporting washers 48 are all made of stainless steel and are thus resistant to the acids. None of the liquid comes into contact with the pump housing 30, the piston sleeves 36, or the pistons 40 and its driving mechanism. As a result, the modified pump handles the acidic fertilizer or other caustic liquids without leakage, deterioration or breakdown.

One of the critical joints in the modified pump 22 (FIG. 3) is the interface between the valve heads 70 and the diaphragms 44. Thus, the rims 50 of the diaphragms fit in the annular grooves 122 and provide a fluid-tight seal, preventing leaks at these joints of the liquid being pumped. Experimentation with modifications of the Hypro pump shows that not all plastics are suitable for the valve heads so that certain plastics might not provide a fluid-tight joint at this interface nor otherwise have the strength and durability to perform as needed. With the use of the thermoplastic UHMW-PE, however, extensive testing on the modified pump of the subject invention shows that the pump can be operated as high as 250 pounds per square inch for several hours without leaking. Normally, such pumps are operated anywhere from 0 to 80 p.s.i., so that normal use of the modified pump is well within its capability.

Although a preferred embodiment of the present invention has been shown and described, various modifications and substitutions may be made thereto without departing from the spirit and scope of the present invention. Accordingly, it is to be understood that the present invention has been described by way of illustration and not limitation.

What is claimed is:

1. In a valve for adapting a pump to handling corrosive liquids, the pump including a housing, a reciprocating piston in the housing, and a diaphragm mounted on the piston, the valve including a reciprocating valve body, the improvement of:

a generally rectangular polygonal valve head of acid-resistant plastic having longitudinally extending front, back, and opposite side faces, and tnnnsversely extending top and bottom faces, each of the faces being smooth and flat, the valve head being provided with an elongated valve chamber extending longitudinally of the valve head having a closed lower end and an open upper end opening out of said top face, the valve chamber being adapted to slidably receive the valve body, the valve head being also provided with a manifold recess extending transversely of the valve head, in fluid-communication with the valve chamber, and opening out of said front face, the valve head having an inlet port in fluid communication with the lower end of the valve chamber and opening out of one side face of the valve head, the valve head also having an outlet port in fluid communication with the upper end of the valve chamber and opening out of the other side face of the valve head, and the valve head being adapted to be releaseably connected in fluid-tight relation to the housing with the manifold recess and the diaphragm forming a manifold.

2. In the valve of claim 1, wherein the plastic is the thermoplastic UHMW-PE.

3. In the valve of claim 1, wherein the valve head has a longitudinal axis, wherein the valve chamber has a longitudinal axis that is laterally offset from the longitudinal axis of the valve head, wherein the inlet port extends both transversely and longitudinally of the valve head from said other side face to the valve chamber, and wherein the outlet port extends transversely of its valve head from said one side face to the valve chamber.

4. In the valve of claim 3, wherein the outlet port is threaded from its respective side wall inwardly of the valve head by a distance just short of the valve chamber, wherein the inlet port is threaded from its respective side wall inwardly of the valve head by the same distance as the threads of the outlet port.

5. In the valve of claim 1, wherein the valve head has a plurality of bores extending transversely through the valve head from its back face to its front face and opening out of these faces, the bores being spaced outwardly of the valve head from the manifold recess and the valve chamber and inwardly of the valve head from the inlet and outlet ports;

wherein bolts extend through the bores for interconnecting the valve head and the housing in fluid-tight relationship with the manifold recess of the valve head in opposed spaced relation to the diaphragm and forming said manifold therewith; and a fastener recessed in the top face of the valve head releasably maintaining the valve body in the chamber.

6. In the valve of claim 1, wherein the valve head is a machined or molded block having a threaded hole drilled therein from its top face on the opposite side of its valve chamber from the outlet port and a countersunk hole extending longitudinally upwardly from the threaded hole and opening out of the top face of the block, said countersunk hole laterally communicating with the upper end of the adjacent valve chamber;

hold-down bolt threaded into the threaded hole of the block with its bolt-head located in the countersunk hole; and a washer around the hold-down bolt overlapping the upper end of the valve body thereby releasably maintaining the valve body in its valve chamber.

7. In the valve of claim 1, wherein the front face of the block is adapted to fit in circumferential fluid-light engagement with the diaphragm, an inlet conduit separate from the housing and releasably connected to the inlet port, an outlet conduit separate from the housing and releasably connected to the outlet port, both of the inlet and outlet conduits being of acid-resistant plastic.

8. In a pump including a pair of valves each including a valve body; a pump housing between the valves and having axially aligned openings that communicate exteriorly of the housing and individually face the valves; axially aligned piston sleeves mounted in the housing and having open ends respectively adjacent to the openings in the housing; flexible, circular diaphragms of acid-resistant material respectively covering the open ends of the sleeves in fluid-tight relation therewith, each diaphragm having an annular rim projecting outwardly away from the housing; pistons individually mounted in the sleeves in engagement with their respectively adjacent diaphragms and being reciprocally movable for alternately flexing their diaphragms outwardly and inwardly respectively in compression and suction strokes; means for reciprocating the pistons alternately between their compression and suction strokes, the housing, sleeves, pistons and reciprocating means all being made of a material that is not resistant to acid, the improvement of pump attachments for enabling the pump to pump acids without corroding the parts of the pump that are not resistant to acids, comprising:

a valve head for each valve machined or molded from acid-resistant plastic into a generally rectangular polygonal block having longitudinally extending front, back, and opposite side faces, and transversely extending top and bottom faces, each of the faces being smooth and flat, the block having a longitudinal axis extending from the top face to the bottom faces equidistantly of the side faces and the front and back faces, the front face of each block being in opposed relation to the housing, each valve head being provided with an elongated cylindrical valve chamber extending longitudinally of the block in transversely offset relation to the longitudinal axis of the block and having a closed lower end and an open upper end opening out of said top face, each valve head being also provided with a frusto-conical manifold recess extending transversely of the block, axially intersecting its valve chamber, and having an inner wall of minimum diameter and an outer opening of maximum diameter that opens out of said front face, each inner wall having an elongated longitudinally extending slot establishing communication between its respective manifold recess and valve chamber, each block having a threaded inlet port extending transversely of its block from one side face into its block to a longitudinal passage that connects to the lower end of its respective valve chamber, each block also having a threaded outlet port extending transversely of its block from the opposite side face into its block directly into fluid communication with the upper end of its respective valve chamber.

9. In the valve of claim 8, wherein each block has a plurality of bores extending transversely through the block from its back face to its front face and opening out of these faces, the bores being spaced outwardly in their blocks from their respective manifold recesses and valve chambers and inwardly in their blocks from the inlet and outlet ports, wherein mounting bolts extend through the bores and being threaded into the housing thereby interconnecting the blocks and the housing in fluid-tight relationship with the inner wall of the manifold recess of each block in opposed spaced relation to its respectively adjacent diaphragm and forming a manifold therebetween, the front face of each block having an annular groove circumscribing the outer opening of its manifold that receives the rim of its respectively adjacent diaphragm in fluid-tight engagement.

10. In the valve of claim 8, wherein an acid-resistant inlet conduit separate from the housing is releasably threaded into the inlet port, and wherein an acid-resistant outlet conduit separate from the housing is releasably threaded into the outlet port.

11. In the valve of claim 8, wherein each block has a threaded hole drilled therein from its top face on the opposite side of its valve chamber from the outlet port for that valve chamber and a countersunk hole extending longitudinally upwardly from the threaded hole and opening out of the top face of its block, said countersunk hole laterally communicating with the upper end of the adjacent valve chamber, wherein a hold-down bolt is threaded into the threaded hole of each block with its bolthead located in its respective countersunk hole, and wherein a washer is around each hold-down bolt sandwiched between the bolthead and the block and overlapping the upper end of its adjacent valve body thereby releasably maintaining the valve body in its respective valve chamber.

12. In the valve of claim 8, wherein the plastic of the valve heads is the thermoplastic UHMW-PE.

13. In the valve of claim 8, wherein an inlet conduit of PVC plastic separate from the housing is releasably threaded into the inlet port, and wherein an acid-resistant outlet of PVC plastic conduit separate from the housing is releasably threaded into the outlet port.

14. In a pump including a pair of valves each including a valve body; a pump housing between the valves and having axially aligned openings that communicate exteriorly of the housing and individually face the valves; axially aligned piston sleeves mounted in the housing and having open ends respectively adjacent to the openings in the housing; pistons individually mounted in the sleeves; flexible, circular diaphragms of acid-resistant material respectively covering the open ends of the sleeves in fluid-tight relation therewith, each diaphragm having an annular rim projecting outwardly away from the housing; mounting bolts connected to the pistons and mounting their respective diaphragms thereon; washers on the bolts sandwiching the diaphragms between the washers and the pistons and being reciprocally movable for alternately flexing their diaphragms for movement outwardly and inwardly respectively in compression and suction strokes; means for reciprocating the pistons alternately between their compression and suction strokes, the housing, sleeves, pistons and reciprocating means all being made of a material that is not resistant to acid, the improvement of pump attachments for enabling the pump to pump acids without corroding the parts of the pump that are not resistant to acids, comprising:

each valve including a valve head that is a piece of acid-resistant plastic machined into a generally rectangular polygonally-shaped block having longitudinally extending front, back, and opposite side faces, and transversely extending top and bottom faces, each of the faces being smooth and flat, the front face of each block being in opposed relation to the housing, said valve heads being mirror images of each other, each valve head being provided with an elongated cylindrical valve chamber extending longitudinally of the block in laterally offset relation to the longitudinal axis of the block and having a closed lower end and an open upper end opening out of said top face, each valve head being also provided with a frusto-conical manifold recess extending transversely of the block, axially intersecting its valve chamber, and having an inner wall of minimum diameter and an outer opening of maximum diameter that opens out of said front face, each inner wall having an elongated longitudinally extending slot establishing communication between its respective manifold recess and valve chamber, each block having a threaded inlet port in fluid communication with the lower end of its respective valve chamber and extending transversely of its block to, and opening out of, one side face of its block, each block also having a threaded outlet port in fluid communication with the upper end of its respective valve chamber and extending transversely of its block to, and opening out of, the other side face of its block, each block further having a plurality of bores extending transversely through the block from its back face to its front face and opening out of these faces, the bores being spaced outwardly in their blocks from their respective manifold recesses and valve chambers and inwardly in their blocks from the inlet and outlet ports, mounting bolts extending through the bores and being threaded into the housing thereby interconnecting the blocks and the housing in fluid-tight relationship with the inner wall of the manifold recess of each block in opposed spaced relation to its respectively adjacent diaphragm and forming a manifold therebetween, the front face of each block having an annular groove circumscribing the outer opening of its manifold that receives the rim of its respectively adjacent diaphragm in fluid-tight engagement, an inlet conduit separate from the housing and threaded into the inlet port about one inch;

an outlet conduit separate from the housing and threaded into the outlet port about one inch, both of the inlet and outlet conduits being of acid-resistant plastic, the valve body being of acid-resistant material and being slidably received in the valve chamber for alternately establishing communication between the inlet port and the manifold when the piston and diaphragm are in their suction stroke while blocking communication between the manifold and the outlet port and between the outlet port and the manifold when the piston and diaphragm are in their compression stroke while blocking communication between the manifold and the inlet port, each block having a threaded hole drilled therein from its top face on the opposite side of its valve chamber from the outlet port for that valve chamber and a countersunk hole extending longitudinally upwardly from the threaded hole and opening out of the top face of its block, said countersunk hole laterally communicating with the upper end of the adjacent valve chamber, a hold-down bolt threaded into the threaded hole of each block with its bolthead located in its respective countersunk hole, and a washer around each hold-down bolt sandwiched between the bolthead and the block and overlapping the upper end of its adjacent valve body thereby releasably maintaining the valve body in its respective valve chamber.

15. In the pump of claim 14, wherein the plastic of the heads is the thermoplastic UHMW-PE, wherein the plastic of the conduits is PVC, and wherein the mounting bolts and washers are of a stainless steel that is acid-resistant.

16. In the valve of claim 1, wherein the valve head is machined into its rectangular polygonal shape from a larger block of such acid resistant plastic.

17. The valve head of claim 1, wherein the overall dimensions of the head are about three and one-half inches wide by about two inches deep by about six inches long.

* * * * *